Figure 1:
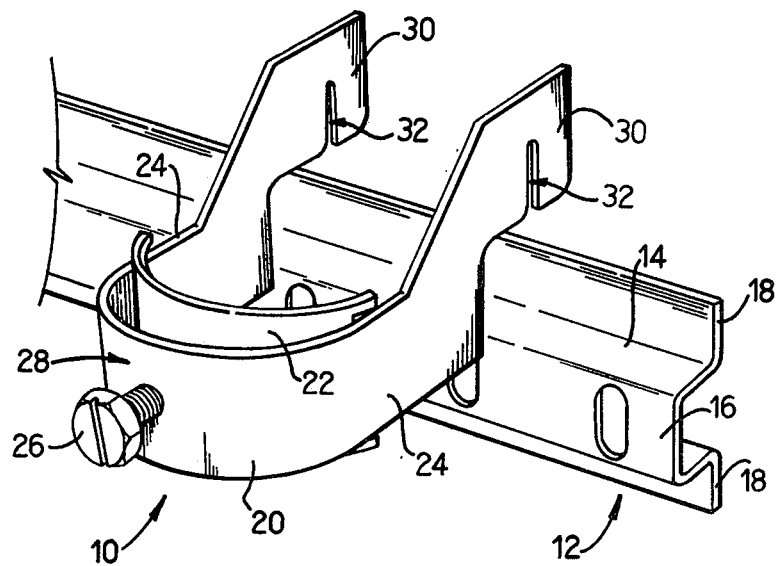

United States Patent [19]

Mantoan et al.

[11] 4,369,945
[45] Jan. 25, 1983

[54] CABLE CLAMPS

[76] Inventors: Dominico Mantoan, 5 van der Next Ave., Norkem Park, Kempton Park, Transvaal Province, South Africa; Mario Morassi, 33020 Ravascletto, Udine, Italy

[21] Appl. No.: 193,040

[22] Filed: Oct. 2, 1980

[30] Foreign Application Priority Data

Oct. 4, 1979 [ZA] South Africa .................. 79/5294

[51] Int. Cl.³ .............................................. F16L 3/08
[52] U.S. Cl. ................................... 248/73; 24/263 A; 248/225.3 R
[58] Field of Search ............. 248/73, 72, 74 R, 225.3, 248/225.2, 214; 24/263 A; 108/109

[56] References Cited

U.S. PATENT DOCUMENTS 3,578,282  5/1971  Olsen ................................. 248/214

FOREIGN PATENT DOCUMENTS

| 318370 | 2/1957 | Switzerland | 248/73 |
| 431853 | 9/1967 | Switzerland | 108/109 |
| 569111 | 5/1945 | United Kingdom . | |
| 580888 | 9/1946 | United Kingdom . | |
| 582208 | 11/1946 | United Kingdom . | |
| 614109 | 12/1948 | United Kingdom . | |
| 653810 | 5/1951 | United Kingdom . | |
| 660026 | 10/1951 | United Kingdom . | |
| 682870 | 11/1952 | United Kingdom . | |
| 682916 | 11/1952 | United Kingdom . | |

*Primary Examiner*—William H. Schultz
*Assistant Examiner*—Ramon O. Ramirez
*Attorney, Agent, or Firm*—Wegner, McCord, Wood & Dalton

[57] ABSTRACT

The invention relates to a cable clamp for clamping cables to the cross rungs of a cable ladder, each cross rung being an elongate element having a 'top' cross-section. The cable clamp includes a U-shaped bracket having a saddle element displaceable relative to the bracket between the limbs thereof, the free ends of the limbs having slot formations therein whereby the bracket can engage one flange or edge region of the cross rung so that with the cable passing between the limbs of the bracket, the saddle element can be displaced towards the cross rung to clamp the cable between the cross rung and the saddle element.

7 Claims, 2 Drawing Figures

U.S. Patent

Jan. 25, 1983

4,369,945

CABLE CLAMPS

This invention relates to clamps. In particular the invention relates to a cable clamp for clamping cables to the cross rungs of a cable ladder.

A cable ladder conventionally comprises a series of parallel spaced apart cross rungs to which cables can be secured for locating such cables between spaced apart locations. Cross rungs, conventionally used in the industry for cable ladders, comprise elongate elements of a sheet-like material formed into any suitable or required cross-section. A particular cable clamp, known to the applicant, and particularly adapted for use with a cross rung comprising an elongate element of a channel shaped crosssection having opposing inwardly projecting lips at the free ends of the opposing walls of the channel section, includes a U-shaped bracket having a saddle element, displaceable relative to the bracket between the limbs thereof. The limbs further include engagement formations for engaging at least one of the lips of the channel section so that with a cable passing between the limbs of the bracket, the saddle element can be displaced towards the cross rung to clamp the cable between the cross rung and the saddle element.

The above cross rung having a channel shaped cross-section was found not to be entirely satisfactory in that it collected moisture and dust within the channel section. The cross rung is further relatively expensive to manufacture. As a result a cross rung having a 'top hat' cross-section was evolved which is relatively cheap and in use does not suffer from the above disadvantages. The above 'top hat' cross-section defines a crown of U-shaped cross-section with two oppositely directed outwardly projecting flanges projecting from the free ends of the crown. The crown is further provided with apertures therein through which straps can pass to tie cables to these cross rungs and this method of securing cables has been in use for many years notwithstanding problems resulting from the above method of securing cables which is time consuming and difficult to effect.

It is accordingly an object of this invention to provide a cable clamp which can co-operate with a cross rung having a 'top hat' cross-section to clamp cables to such a cross rung.

It is a further object of the invention to provide a cable clamp to co-operate with a cross rung having a 'top hat' cross-section which can clamp a cable to such a cross rung without exerting a bending force on the cable.

According to the invention there is provided a cable clamp for clamping a cable to a cross rung of a cable ladder, each cross rung comprising an elongate element of a sheet-like material having at least one planar longitudinal edge region projecting away from its longitudinal axis, which cable clamp includes a U-shaped bracket having two limbs and a base and a saddle element displaceable relative to the bracket between the limbs with the free ends of the limbs having hook-like formations whereby the bracket can engage the longitudinal edge region of the cross rung.

Preferably the hook-like formations may be slots which can slidably engage the longitudinal edge of a cross rung.

The U-shaped bracket may be of a sheet material. Furthermore, the saddle element may be displaceable by an adjustable bolt screwingly engaged in the base of the U-shaped bracket.

For a cable, particularly for use with a cross rung having a 'top hat' cross-section, the free ends of the limbs of the U-shaped bracket may be off-set to the extent that the saddle element is in register with a crown region of the cross rung when the bracket is engaged with the cross rung. The limbs may further be planar and may be stepped at their free ends to define tread edges that are parallel with the slots, the separation of the slots and the tread edges being substantially equal to the thickness of the rung.

Conveniently the slot may have substantially the same depth as the length of a flange portion of the rung. Each limb may have only one hook-like formation which is exposed such that the clamp may engage the rung in a transverse manner.

Further according to the invention there is provided a cable ladder comprising a plurality of elongate cross rungs to which is secured at least one cable clamp in accordance with the invention.

Figure 2:
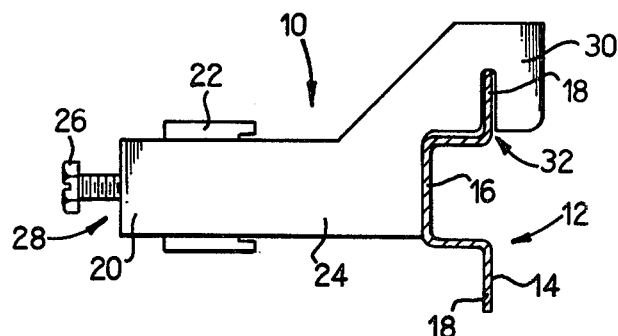

The invention is now described, by way of an example, with reference to the accompanying drawings, in which:

FIG. 1 shows a perspective view of a cable clamp, in accordance with the invention, just prior to engagement with a cross rung; and FIG. 2 shows a side view of the clamp of FIG. 1, engaged with the cross rung.

Referring to the drawings a cable clamp for clamping cables to the cross rungs of a cable ladder, is generally indicated by the reference numeral 10. The clamp 10 is engageable with any one of a plurality of lateral cross rungs forming a cable ladder, only one of such cross rungs 12 shown. Each cross rung 12 has a top hat cross-section being in the form of an elongate element 14 defining a crown 16 in the form of a U-shaped channel section and two oppositely directed outwardly projecting flanges 18 projecting from the free ends of the crown 16.

The cable clamp 10 includes a U-shaped bracket 20 and an arcuate saddle element 22 displaceable between the limbs 24 of the bracket 20 by means of an adjustable bolt 26 which is screwingly engaged in the base region 28 of the bracket 20.

The free ends 30 of the limbs 24 are provided with slots 32 whereby the bracket 20 can engage one of the flanges 18 of a cross rung 12 as shown. The free ends 30 of the limbs 24, in which the slots 32 are provided, are off-set relative to the remainder of the limb 24 and thus the bracket 20 so that the saddle element is located in register with the crown 16 of the cross rung 12. The depth of the slots 32 is equal to the length of the flanges 18 the said length being the distance from the crown 16 to the longitudinal edge of the flange. In this way the bracket 26 is properly located when the slots 32 are engaged with the flange 18 of a cross rung 12. With this arrangement there is no twisting action of the clamp 10 about the cross rung 12 when clamping a cable to the cross rung 12.

In use, cables are located in position relative to the cross rungs of a cable ladder and the U-shaped brackets 20 are engaged with the cross rungs by means of the slots 32 so as to entrap the cables between the limbs 24 of the bracket 20. The bolts 26 are then tightened in order to clamp the cables between the saddle elements 22 and the crowns 16 of the cross rungs 12, at the same time clamping the brackets 20 to the cross rungs 12.

Cable clamps 10 are relatively economic to manufacture and are very simple to operate in order to clamp cables to the cross rungs of a cable ladder which may otherwise be very time consuming, particularly in view of the multitude of clamps 10 used in various installations.

We claim:

1. In combination with an elongated cross-rung of a cable ladder in which the cross-rung has a forwardly protruding portion and a longitudinally extending flange, a cable clamp for clamping a flexible cable to said cross-rung comprising: a U-shaped bracket having a base and two arms extending rearwardly of said base, each arm having a shoulder for positioning adjacent said forwardly protruding portion and an offset free end portion provided with hook-like formations positioned and shaped to engage said flange; and a saddle element adjustably mounted on the bracket between said arms and positioned to engage a cable interposed between said arms and extending transversely of said cross-rung, whereby adjustment of said saddle element toward the forwardly protruding portion clamps the cable between the saddle element and the forwardly protruding portion, engages the hook-like formations with said flange, and positions the shoulder of each arm adjacent the forwardly protruding portion.

2. The combination as specified in claim 1 in which each hook-like formation is a slot positioned to slidably engage the flange of the cross-rung.

3. The combination as specified in claim 2 in which each slot is substantially of the same depth as the transverse dimension of the flange.

4. The combination as specified in claim 2 in which the shoulder of each arm is generally parallel to the corresponding slot of each arm, the slots and shoulders being separated by a distance substantially equal to the thickness of the cross-rung.

5. The combination as specified in claim 1 in which the saddle element is adjustable by an adjustable bolt screwingly engaged in the base of the U-shaped bracket.

6. The combination as specified in claim 1 in which the protruding portion is a crown.

7. The combination as specified in claim 1 in which the cross-rung has a top-hat shape in cross-section, the protruding portion affording a crown with a second longitudinally extending flange positioned oppositely from the initial flange.

* * * * *